(12) United States Patent  
Li

(10) Patent No.: US 12,059,614 B2  
(45) Date of Patent: Aug. 13, 2024

(54) VIRTUAL OBJECT CONTROL METHOD AND APPARATUS, COMPUTER DEVICE, AND STORAGE MEDIUM

(71) Applicant: TENCENT TECHNOLOGY (SHENZHEN) COMPANY LIMITED, Shenzhen (CN)

(72) Inventor: Peiyan Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 305 days.

(21) Appl. No.: 17/505,589

(22) Filed: Oct. 19, 2021

(65) Prior Publication Data

US 2022/0040574 A1  Feb. 10, 2022

Related U.S. Application Data

(63) Continuation of application No. PCT/CN2021/079782, filed on Mar. 9, 2021.

(30) Foreign Application Priority Data

Apr. 29, 2020 (CN) .......................... 202010357093.9

(51) Int. Cl.
  *A63F 13/422* (2014.01)
  *A63F 13/56* (2014.01)

(52) U.S. Cl.
  CPC ............ *A63F 13/422* (2014.09); *A63F 13/56* (2014.09); *A63F 2300/64* (2013.01); *A63F 2300/807* (2013.01)

(58) Field of Classification Search
  CPC .................................................... A63F 13/422
  See application file for complete search history.

(56) References Cited

U.S. PATENT DOCUMENTS 8,210,943 B1 *  7/2012  Woodard ................ A63F 13/69  
                                                                                                                 463/2  
8,926,430 B1 *  1/2015  Ikeda ...................... A63F 13/40  
                                                                                                                  463/31  
(Continued)

FOREIGN PATENT DOCUMENTS

CN           1254893 A     5/2000  
CN      105511930 A     4/2016  
(Continued)

OTHER PUBLICATIONS

Intellectual Property Office of Singapore Search report for Application No. 11202111730Q Oct. 15, 2023 11 pages.

(Continued)

*Primary Examiner* — Seng H Lim  
(74) *Attorney, Agent, or Firm* — ANOVA LAW GROUP, PLLC

(57) ABSTRACT

This application discloses a virtual object control method and apparatus, a computer device, and a storage medium. The virtual control method includes detecting a selection operation on a target skill, the target skill adjusting an action effect of a target virtual prop to a target action effect, the target virtual prop being a virtual prop of a first virtual object; determining, in response to detecting the selection operation on the target skill, a target virtual object in a virtual scene, the target virtual object being an action target of the target virtual prop; and triggering the target virtual prop to perform in an automatic attack mode when the target virtual object is in an action region of the target virtual prop, the automatic attack mode including automatically initiating an attack on the target virtual object when detecting no triggering operation on the target virtual prop.

20 Claims, 8 Drawing Sheets

(56) References Cited

U.S. PATENT DOCUMENTS

| | | | |
|---|---|---|---|
| 10,456,667 | B2 | 10/2019 | Tang et al. |
| 10,493,361 | B2 | 12/2019 | Tang et al. |
| 10,814,221 | B2 | 10/2020 | Tang et al. |
| 2006/0183521 | A1* | 8/2006 | Hamamoto ............ A63F 13/822 463/8 |
| 2012/0322523 | A1* | 12/2012 | Woodard ................ A63F 13/69 463/2 |
| 2013/0241829 | A1 | 9/2013 | Kim |
| 2014/0118563 | A1 | 5/2014 | Mehta et al. |
| 2016/0171835 | A1* | 6/2016 | Washington ........ G07F 17/3223 463/25 |
| 2017/0282076 | A1* | 10/2017 | Tsui ........................ A63F 13/35 |
| 2017/0291108 | A1* | 10/2017 | Kim ...................... A63F 13/525 |
| 2017/0319961 | A1 | 11/2017 | Dunn |
| 2017/0340959 | A1* | 11/2017 | Tang ..................... A63F 13/426 |
| 2018/0071628 | A1* | 3/2018 | Tang ....................... A63F 13/30 |
| 2018/0339229 | A1* | 11/2018 | He ...................... G06F 3/04847 |
| 2019/0160379 | A1* | 5/2019 | Matsushita ............. A63F 13/58 |
| 2019/0366213 | A1* | 12/2019 | Zhou ..................... A63F 13/533 |
| 2020/0086216 | A1* | 3/2020 | Shimomoto ............ A63F 13/58 |
| 2021/0170276 | A1* | 6/2021 | Hwang ................... A63F 13/42 |
| 2022/0001280 | A1* | 1/2022 | Lee ........................ A63F 13/23 |

FOREIGN PATENT DOCUMENTS

| | | |
|---|---|---|
| CN | 106621334 A | 5/2017 |
| CN | 109843399 A | 6/2019 |
| CN | 110613938 A | 12/2019 |
| CN | 110694261 A | 1/2020 |
| CN | 110787450 A | 2/2020 |
| CN | 110812837 A | 2/2020 |
| CN | 110955370 A | 4/2020 |
| CN | 111589136 A | 8/2020 |
| JP | 2014028015 A | 2/2014 |
| JP | 2017018574 A | 1/2017 |
| JP | 2018517533 A | 7/2018 |
| JP | 2018518997 A | 7/2018 |
| JP | 2018524060 A | 8/2018 |
| KR | 20140122610 A | 10/2014 |
| KR | 20150064267 A | 6/2015 |
| WO | 2014199693 A1 | 12/2014 |

OTHER PUBLICATIONS

The Japan Patent Office (JPO) Notification of Reasons for Refusal for Application No. 2021-564356 and Translation Apr. 4, 2022 5 Pages.

The State Intellectual Property Office of the People's Republic of China (SIPO) Office Action 1 for for 202010357093.9 Apr. 6, 2021 9 Pages (including translation).

The World Intellectual Property Organization (WIPO) International Search Report for PCT/CN2021/079782 Jun. 7, 2021 14 Pages (including translation).

Korean Intellectual Property Office (KIPO) Request for the Submission of an Opinion for 10-2021-7034070 Oct. 21, 2021 19 Pages (including translation).

'The Lineage m guide tip, and (it asks as the secondary agent: what)', internet posted writing, (Jun. 22, 2017), <https://ribin.tistory.com/143>.

The automatic combat introduction (correction), internet posted writing, (Jun. 21, 2004), <mabi.labanyu.com/official/dev note/10365>.

* cited by examiner

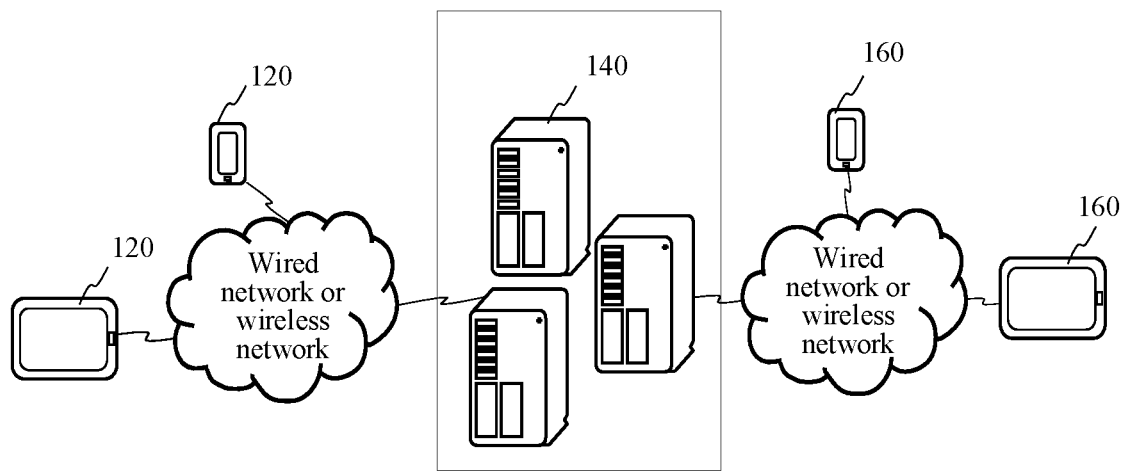

FIG. 1

A terminal detects a selection operation on a target skill, the target skill being used for adjusting an action effect of a target virtual prop to a target action effect, the target virtual prop being a virtual prop of a first virtual object, and the first virtual object being a virtual object controlled by a terminal — 201

The terminal determines, in response to detecting the selection operation on the target skill, a target virtual object in a virtual scene, the target virtual object being an action target of the target virtual prop — 202

The terminal triggers, in response to the target virtual object being in an action region of the target virtual prop, the target virtual prop to perform an automatic attack mode, the automatic attack mode being to automatically initiate, in a case of detecting no triggering operation on the target virtual prop, an attack on the target virtual object, to generate the target action effect on the target virtual object — 203

FIG. 2

VIRTUAL OBJECT CONTROL METHOD AND APPARATUS, COMPUTER DEVICE, AND STORAGE MEDIUM

RELATED APPLICATIONS

This application is a continuation application of PCT Application No. PCT/CN2021/079782, filed on Mar. 9, 2021, which in turn claims priority to Chinese Patent Application No. 202010357093.9, filed on Wednesday, Apr. 29, 2020, and entitled "VIRTUAL OBJECT CONTROL METHOD AND APPARATUS, COMPUTER DEVICE, AND STORAGE MEDIUM." The two applications are incorporated herein by reference in their entirety.

FIELD OF THE TECHNOLOGY

This application relates to the field of computer technologies, and in particular, to a virtual object control method and apparatus, a computer device, and a storage medium.

BACKGROUND OF THE DISCLOSURE

With the development of computer technologies and the diversification of terminal functions, there are an increasing number of mobile phone games. A multiplayer online battle arena (MOBA) game gradually becomes an extremely important game among the mobiles phone games. In the current MOBA game, a player may control a target virtual object to initiate an attack on another virtual object, and in this process, the player may perform a basic attack, or may augment an action effect of a basic attack by using a skill, that is, perform an enhanced attack.

SUMMARY

Embodiments of this application provide a virtual object control method and apparatus, a computer device and a storage medium, and the technical solutions are as follows:

One aspect of the present application provides a virtual object control method, applicable to a computer device, the method including: detecting a selection operation on a target skill, the target skill adjusting an action effect of a target virtual prop to a target action effect, the target virtual prop being a virtual prop of a first virtual object, and the first virtual object being a virtual object controlled by a terminal; determining a target virtual object in a virtual scene in response to detecting the selection operation on the target skill, the target virtual object being an action target of the target virtual prop; and triggering the target virtual prop to perform in an automatic attack mode in response to the target virtual object being in an action region of the target virtual prop, the automatic attack mode including automatically initiating an attack on the target virtual object in a case of detecting no triggering operation on the target virtual prop.

Another aspect of the present application provides a virtual object control apparatus, including: a detecting module, configured to detect a selection operation on a target skill, the target skill being used for adjusting an action effect of a target virtual prop to a target action effect, the target virtual prop being a virtual prop of a first virtual object, and the first virtual object being a virtual object controlled by a terminal; a determining module, configured to determine a target virtual object in a virtual scene in response to detecting the selection operation on the target skill, the target virtual object being an action target of the target virtual prop; and a triggering module, configured to trigger the target virtual prop to perform in an automatic attack mode, in response to the target virtual object being in an action region of the target virtual prop, the automatic attack mode including automatically initiating an attack on the target virtual object in a case of detecting no triggering operation on the target virtual prop.

Another aspect of the present application a computer device, including one or more processors and one or more memories storing at least one piece of program code, the at least one piece of program code being loaded and executed by the one or more processors to implement the virtual object control method.

Another aspect of the present application provides a non-transitory computer-readable storage medium, storing at least one piece of program code, the at least one piece of program code being loaded and executed by a processor, to implement the virtual object control method.

BRIEF DESCRIPTION OF THE DRAWINGS

To describe the technical solutions in the embodiments of this application more clearly, the accompanying drawings required for describing the embodiments are briefly described below. Apparently, the accompanying drawings in the following descriptions show merely some embodiments of this application, and a person of ordinary skill in the art may obtain other accompanying drawings according to these accompanying drawings without creative efforts.

FIG. 1 is a schematic diagram of an implementation environment of a virtual object control method according to an embodiment of this application.

FIG. 2 is a flowchart of a virtual object control method according to an embodiment of this application.

DESCRIPTION OF EMBODIMENTS

Figure 3:
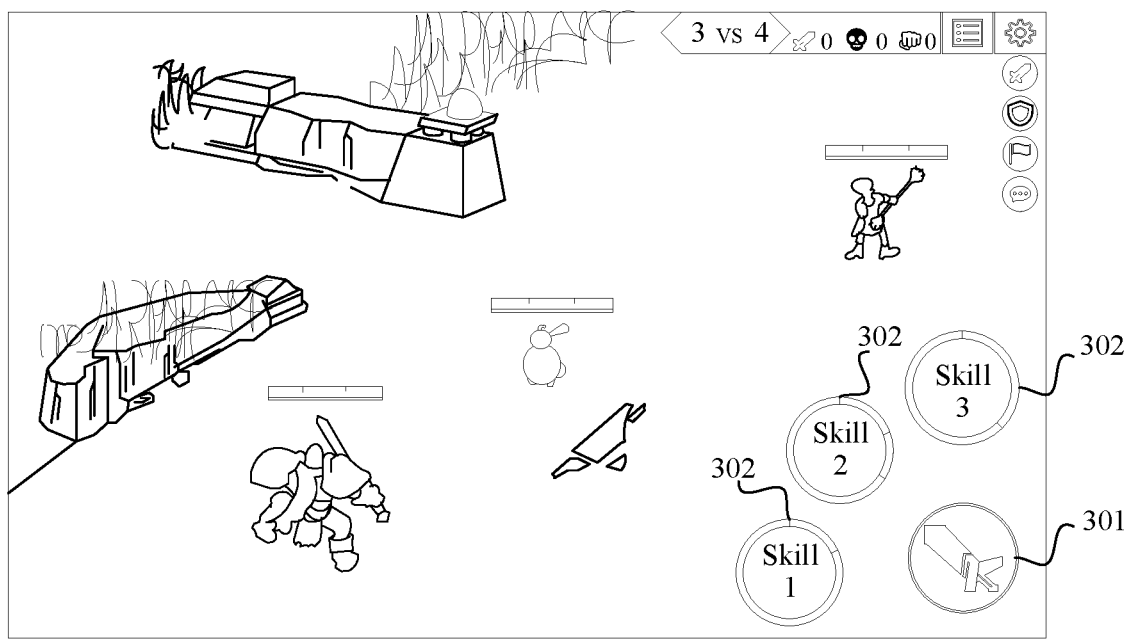
FIG. 3 is a schematic diagram of an operation interface according to an embodiment of this application.

To make the objectives, technical solutions, and advantages of this application clearer, the following further describes implementations of this application in detail with reference to the accompanying drawings. Evidently, the described embodiments are a part rather than all the embodiments of this application. All other embodiments obtained by a person of ordinary skill in the art based on the embodiments of this application without creative efforts shall fall within the protection scope of this application.

The terms "first", "second", and the like in this application are used for distinguishing between same items or similar items of which effects and functions are basically the same. It is to be understood that, the "first", "second", and "$n^{th}$" do not have a dependency relationship in logic or time sequence, and a quantity and an execution order thereof are not limited.

For ease of understanding the technical solutions in the embodiments of this application, some terms involved in the embodiments of this application are explained below.

Virtual scene: a virtual scene displayed (or provided) when an application program is run on a terminal. The virtual scene may be a simulated environment of a real world, or may be a semi-simulated semi-fictional virtual environment, or may be an entirely fictional virtual environment. The virtual scene may be any one of a two-dimensional virtual scene, a 2.5-dimensional virtual scene, and a three-dimensional virtual scene. This is not limited in this application. For example, the virtual scene may include the sky, the land, the ocean, or the like. The land may include environmental elements such as the desert and a city. The user may control the virtual object to move in the virtual scene.

Virtual object: a movable object in a virtual scene. The movable object may be a virtual character, a virtual animal, or a cartoon character. The virtual object may be a virtual image used for representing the user in the virtual scene. The virtual scene may include a plurality of virtual objects, and each virtual object has a shape and a volume in the virtual scene, and occupies space in the virtual scene. In some embodiments, the virtual object may be a character controlled through an operation on a client, or may be an artificial intelligence (AI) character set in a virtual environment battle through training, or may be a non-player character (NPC) set in a virtual scene battle. In some embodiments, the virtual object is a virtual character performing sports in a virtual scene. In some embodiments, a quantity of virtual objects in the virtual scene battle may be preset, or may be dynamically determined according to a quantity of clients participating in the battle. The implementation is not limited by the embodiments described in this application. In one embodiment, a user may control a virtual object to move in the virtual scene, for example, control the virtual object to run, jump, crawl and the like, or may control a virtual object to use a skill, a virtual prop and the like provided by an application program to fight against another virtual object.

A MOBA game is a game in which several forts are provided in a virtual scene, and users on different camps control virtual objects to battle in the virtual scene, occupy forts or destroy forts of the opposing camp. For example, a MOBA game may divide users into at least two opposing camps, and different virtual teams on the at least two opposing camps occupy respective map regions, and fight against each other using specific victory conditions as goals. Each virtual team includes one or more virtual objects. The victory conditions include, but are not limited to at least one of occupying forts or destroy forts of the opposing camps, killing virtual objects in the opposing camps, ensure own survivals in a specified scenario and time, seizing a specific resource, and outscoring the opponent within a specified time. The MOBA game may take place in rounds, and each round of the battle arena may have the same map or different maps. A duration of one round of the MOBA game is from a moment at which the game starts to a movement at which the victory condition is met.

An active target is a virtual object manually selected by a user in a virtual scene.

Tagged target: after any virtual object in a virtual scene is hit by a type of skill, the virtual object becomes a tagged target in a target effective duration, the target effective duration being used for indicating an effective period of the tagged target. In a case that the current moment is in the target effective duration, the tagged target is effective; in a case that the current moment is not in the target effective duration, the tagged target is ineffective. In some embodiments, the type of skill is set by a developer, and a specific duration of the target effective duration can also be set by the developer.

An auxiliary attack means that an application program assists a first virtual object controlled by a user in initiating an attack. For example, the auxiliary attack includes automatically determining an attacked target virtual object, and when the user selects a skill, a virtual prop corresponding to the skill is automatically triggered, that is, the first virtual object is automatically controlled to use the virtual prop to initiate an attack on the target virtual object. The specific content of the auxiliary attack is not limited in the embodiments of this application.

Often, when a player is to use a skill, the player needs to first click/tap a skill control and then click/tap a base attack control, to cast this skill. Moreover, to improve accuracy of the attack, the user usually needs to manually select an attacked virtual object. When a virtual object is attacked in rapid succession, the user needs to repetitively quickly click/tap a skill control and a base attack control. Moreover, after each attack, the user needs to manually select a next attack target. As a result, operation steps are cumbersome, operation difficulty is relatively high, a case of discontinuous attacks caused because of untimely operations is prone to occur, man-machine interaction efficiency is relatively low, and consequently, user experience is affected.

FIG. 1 is a schematic diagram of an implementation environment of a virtual object control method according to an embodiment of this application. Referring to FIG. 1, the implementation environment may include: a first terminal 110, a server 140, and a second terminal 160.

An application program supporting display of a virtual scene and a virtual object is installed and run on the first terminal 110. The application program may be any one of a virtual reality application program, a three-dimensional map program, a military simulation program, a role-playing game (RPG), a multiplayer online battle arena (MOBA) game, and a multiplayer gunfight survival game. The first terminal 110 is a terminal used by a first user, and the first user uses the first terminal 110 to operate a first virtual object in the virtual scene to perform a movement. The movement includes, but is not limited to, at least one of body posture adjustment, crawling, walking, running, cycling, jumping, driving, picking-up, shooting, attacking, and throwing. For example, the first virtual object is a first virtual character, such as a simulated person role or a cartoon character role.

The first terminal 110 is connected to the server 140 by using a wireless network or a wired network.

The server 140 may be a server, a plurality of servers, a cloud computing platform, and a virtualization center. The server 140 is configured to provide a backend service for an application program supporting a virtual scene. In some embodiments, the server 140 is responsible for primary computing work, and the first terminal 110 and the second terminal 160 are responsible for secondary computing work; or the server 140 is responsible for secondary computing work, and the first terminal 110 and the second terminal 160 are responsible for primary computing work; or the server 140, the first terminal 110 and the second terminal 160 perform collaborative computing by using a distributed computing architecture among each other.

An application program supporting display of a virtual scene and a virtual object is installed and run on the second terminal 160. The application program may be any one of a virtual reality application program, a three-dimensional map program, a military simulation program, a role-playing game (RPG), a multiplayer online battle arena (MOBA) game, and a multiplayer gunfight survival game. The second terminal 160 is a terminal used by a second user, and the second user uses the second terminal 160 to operate a second virtual object in the virtual scene to perform a movement. The movement includes, but is not limited to, at least one of body posture adjustment, crawling, walking, running, cycling, jumping, driving, picking-up, shooting, attacking, and throwing. For example, the second virtual object is a second virtual character, such as a simulated person role or a cartoon character role.

The second terminal 160 is connected to the server 140 by using a wireless network or a wired network.

In some embodiments, the first virtual object controlled by the first terminal 110 and the second virtual object controlled by the second terminal 160 are located in the same virtual scene, and in this case, the first virtual object may interact with the second virtual object in the virtual scene. In some embodiments, the first virtual object and the second virtual object may be hostile to each other, for example, the first virtual object and the second virtual object may belong to different groups, and the virtual objects in the hostile relationship may attack each other by applying different skills, thereby performing battle style interaction, and displaying performance effects triggered by the skills in the first terminal 110 and the second terminal 160.

In some other embodiments, the first virtual object and the second virtual object may be in a teammate relationship, for example, the first virtual object and the second virtual object may belong to the same group, have a friend relationship, or have a temporary communication permission.

In some embodiments, the application programs installed on the first terminal 110 and the second terminal 160 are the same, or the application programs installed on the two terminals are the same type of application programs on different operating system platforms. The first terminal 110 may generally refer to one of a plurality of terminals, the second terminal 160 may generally refer to one of a plurality of terminals, and this embodiment is described only by using the first terminal 110 and the second terminal 160 as an example. The device types of the first terminal 110 and the second terminal 160 are the same or different. The device types include at least one of a smartphone, a tablet computer, a Moving Picture Experts Group Audio Layer III (MP3) player, a Moving Picture Experts Group Audio Layer IV (MP4) player, a laptop portable computer, and a desktop computer. For example, the first terminal 110 and the second terminal 160 are smartphones, or other handheld portable game devices. The following embodiment is described by using an example that the terminal includes a smartphone.

A person skilled in the art may learn that, there may be more or fewer terminals. For example, there may be only one terminal, or there are dozens of, hundreds of, or more terminals. The quantity and the device type of the terminals are not limited in the embodiments of this application.

The virtual object control method provided in the embodiments of this application is applicable to a plurality of types of application programs. For example, the method is applicable to a MOBA game, the MOBA game may be provided with a plurality of virtual props and skills, and by using an example in which the virtual prop is a prop used for performing an ordinary attack, a user can use a skill through a computer device, to enhance an action effect of the virtual prop, that is, enhance the ordinary attack. In some embodiments, damage caused by the enhanced ordinary attack to a virtual object is greater than that caused by the ordinary attack. By applying the technical solution provided in this embodiment, after the user has selected a skill, the computer device can automatically trigger the virtual prop, that is, automatically control the virtual object to use the virtual prop to initiate an attack on the target virtual object, to generate an enhanced action effect on the target virtual object. In the technical solution provided in this embodiment, the user does not need to manually click/tap a virtual prop to perform triggering, to effectively simplify operation steps of the user and reduce operation difficulty, thereby improving man-machine interaction efficiency and providing the user with good interaction experience.

FIG. 2 is a flowchart of a virtual object control method according to an embodiment of this application. The method is applicable to any terminal in the foregoing implementation environment, and the virtual object control method provided in this embodiment is described with reference to FIG. 2:

201. A terminal detects a selection operation on a target skill, the target skill being used for adjusting an action effect of a target virtual prop to a target action effect, the target virtual prop being a virtual prop of a first virtual object, and the first virtual object being a virtual object controlled by a terminal.

In some embodiments, the terminal is a terminal used by any user, the virtual object controlled by the terminal is the first virtual object, and the first virtual object can use a virtual prop to fight against another virtual object in a virtual scene. In some embodiments, use of different virtual props by the virtual object can generate different action effects on another virtual object. In this embodiment, the action effect changes an attribute value of another virtual object, for example, reduces a health point of another virtual object. In this embodiment, description is performed by using an example in which the target virtual prop is a virtual prop used for performing an ordinary attack, the target virtual prop can correspond to at least one skill, and the skill can be used for adjusting an action effect of the target virtual prop. In some embodiments, the adjusting is to augment the action effect of the target virtual prop to a target action effect. For example, the target virtual prop corresponds to a skill 1 or a skill 2, use of the skill 1 can increase damage generated by the target virtual prop by 10%, and use of the skill 2 can increase damage generated by the target virtual prop by 20%. For example, without using the skill 1 or the skill 2, use of the target virtual prop by the first virtual object can cause damage 200 to another virtual object, and after use of the skill 1, use of the target virtual prop by the first virtual object can cause damage 200*(1+10%)=220 to another virtual object. In some embodiments, any skill corresponding to the target virtual prop can serve as the target skill.

In one embodiment, in response to a round start operation of the user, the terminal displays an operation interface. In some embodiments, the operation interface includes a virtual scene, a virtual object, a virtual prop selection control, a skill selection control, and the like, and the round start operation is a click/tap operation on a round start control. FIG. 3 is a schematic diagram of an operation interface according to an embodiment of this application. Referring to FIG. 3, the operation interface displays a selection control 301 of the target virtual prop, and skill selection controls 302 of the target virtual prop. The terminal can detect a selection operation of a user on a target skill in the operation interface in real time. In some embodiments, the selection operation is a click/tap operation on a selection control of the target skill, or a touch and hold operation on a selection control of the target skill, or the like. In some other embodiments, the selection operation is a triggering operation on a shortcut key corresponding to the target skill, and in a case that the shortcut key corresponding to the target skill is a volume increase key, the selection operation is to press a volume increase key. A type of the selection operation is not limited in this embodiment.

202. The terminal determines, in response to detecting the selection operation on the target skill, a target virtual object in a virtual scene, the target virtual object being an action target of the target virtual prop.

The target virtual object is an attacked virtual object. In some embodiments, the target virtual object and the first virtual object are in a hostile relationship, for example, the target virtual object and the first virtual object belong to different groups. In some embodiments, the target virtual object is a non-player character set in an application program, for example, a creep or a monster. The implementation is not limited by the embodiments described in this application.

In one embodiment, the user can select a virtual object in the virtual scene through the terminal as the target virtual object. In one embodiment, the terminal can also determine a virtual object previously attacked by the first virtual object as the target virtual object. A specific determining method for the target virtual object is not limited in this embodiment.

203. The terminal triggers, in response to the target virtual object being in an action region of the target virtual prop, the target virtual prop to perform an automatic attack mode, the automatic attack mode being to automatically initiate, in a case of detecting no triggering operation on the target virtual prop, an attack on the target virtual object, to generate the target action effect on the target virtual object.

In some embodiments, different virtual props correspond to different action regions, an action region is a round region determined by using a location of the first virtual object as a center, and a virtual prop can generate an action effect on a virtual object in an action region of the virtual prop. For example, a virtual prop is a virtual knife, and when using the virtual prop, the first virtual object can cause damage to another virtual object in an action range of the virtual prop.

In one embodiment, the terminal can obtain a location of the target virtual object in the virtual scene. In a case that the location of the target virtual object is in an action region of the target virtual prop, the terminal triggers the target virtual prop to perform an automatic attack mode, that is, automatically triggers the target virtual prop, controls the first virtual object to use the target virtual prop to perform an attack on the target virtual object, and generates the target action effect on the target virtual object, to change an attribute value of the target virtual object. For example, if the attribute value is a health point of the virtual object, the foregoing changing the attribute value of the target virtual object is reducing the health point of the target virtual object.

In the technical solution provided in this embodiment, a selection operation on a target skill is detected, and the action effect of the target virtual prop is adjusted to a target action effect; and an attacked target virtual object is determined in a virtual scene, and when the target virtual object is in an action region of the target virtual prop, the target virtual prop is automatically triggered, to cause the first virtual object controlled by the user to use the target virtual prop to automatically initiate an attack on the target virtual object, to generate the target action effect on the target virtual object. By applying this solution, after completing skill selection, the user does not need to manually trigger the target virtual prop, thereby simplifying operation steps of the user, and improving operation efficiency, that is, improving man-machine interaction efficiency, so that user experience is greatly improved.

Figure 4:
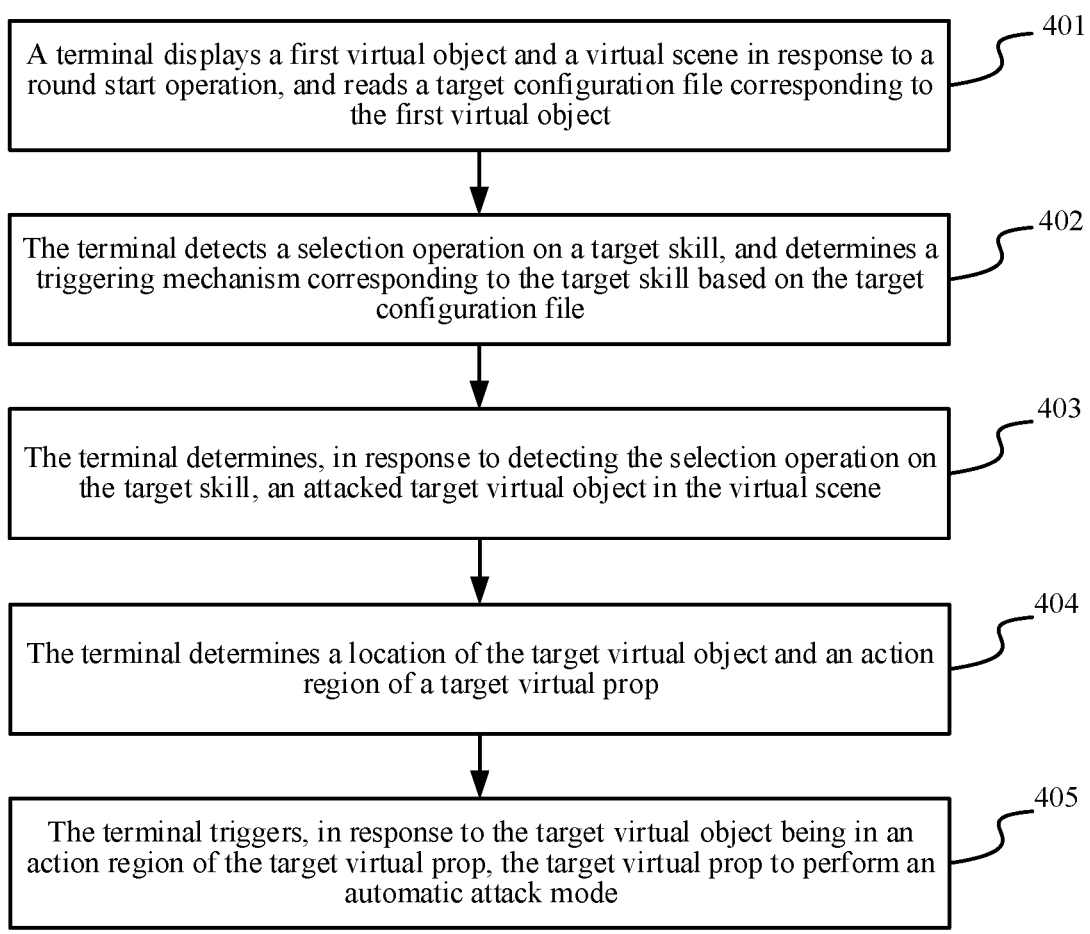
FIG. 4 is a flowchart of a virtual object control method according to an embodiment of this application.

The virtual object control method provided in this application is briefly described in the foregoing embodiment, and the method is described in detail below with reference to FIG. 4. FIG. 4 is a flowchart of a virtual object control method according to an embodiment of this application. The method is applicable to the implementation environment shown in FIG. 1. Referring to FIG. 4, this embodiment includes the following steps:

401. A terminal displays a first virtual object and a virtual scene in response to a round start operation, and reads a target configuration file corresponding to the first virtual object.

The round start operation is used for triggering start of a round of game, and is, for example, a click/tap operation on a round start control. The implementation is not limited by the embodiments described in this application.

In this embodiment, after detecting the round start operation, the terminal can enter a target round, that is, enter a round of game. The terminal can display the operation interface shown in FIG. 3, and the operation interface displays a virtual scene corresponding to the target round, the first virtual object controlled by the terminal and the selection control of the target virtual prop. In some embodiments, the operation interface further displays a skill selection control corresponding to the target virtual prop, a virtual object controlled by another terminal and the like. The implementation is not limited by the embodiments described in this application.

In one embodiment, the terminal reads a target configuration file in response to the round start operation, where the target configuration file stores configuration information of the first virtual object. The terminal can determine, based on the configuration information in the target configuration file, a triggering mechanism corresponding to each skill, to perform a subsequent virtual prop triggering step. In one embodiment, the target configuration file stores a target effective duration, at least one skill identifier and other configuration information, the at least one skill identifier being used for indicating at least one skill, and the target effective duration being used for indicating a triggering mechanism of the at least one skill. In some embodiments, the target effective duration and the skill identifier can be both set by a developer. The terminal can obtain the target effective duration from the target configuration file, and determine, in a case that the target effective duration is greater than 0, the triggering mechanism corresponding to the skill as automatic triggering; otherwise, determine the triggering mechanism corresponding to the skill as manual triggering. In this embodiment, the terminal triggers, in a case that a triggering mechanism corresponding to the skill is manual triggering, the target virtual prop in response to detecting a triggering operation on the target virtual prop. That is, the terminal needs to detect a triggering operation on the virtual prop corresponding to the skill in the virtual scene, and can trigger the virtual prop only when the triggering operation on the virtual prop is detected; in a case that the triggering mechanism corresponding to the skill is automatic triggering, the terminal does not need to detect triggering of the user on the virtual prop, and when a target condition is met, the terminal may trigger the virtual prop to perform the automatic attack mode, the automatic attack mode being that the terminal automatically controls the first virtual object to use the virtual prop to perform an attack on another virtual object. In some embodiments, the target condition is set by the developer. For example, the target condition is set as detecting a triggering operation on any skill corresponding to the virtual prop, or set as detecting a triggering operation on any skill corresponding to the virtual prop, and a virtual object that can be attacked exists in the virtual scene. Specific content of the target condition is not limited in this embodiment. Alternatively, when detecting that the application program is started and user login is completed, the terminal can perform the operation of reading the target configuration file, and an occasion on which the terminal reads the target configuration file is not limited in this embodiment. In some embodiments, a triggering mechanism corresponding to each skill can also be indicated by other information. The implementation is not limited by the embodiments described in this application. In this embodiment, description is made by using an example in which only the target effective duration is used for indicating the triggering mechanism.

In this embodiment, the foregoing automatic triggering mechanism is an auxiliary attack, that is, the user does not need to manually trigger a virtual prop, and the application program automatically triggers a virtual prop, to assist the first virtual object controlled by the user in performing an attack. Using a process of triggering a virtual prop in a MOBA game as an example, after detecting that the user clicks/taps any skill, the terminal further needs to again detect a click/tap operation of the user on a virtual prop corresponding to the skill, that is, only after manually clicking/tapping the virtual prop, the user can control the first virtual object to initiate an attack. In some embodiments, a click/tap operation of the user on a virtual prop is a click/tap operation of the user on an attack control, and is similar to a control used for skill selection, and when the user clicks/taps the attack control, the terminal can control the first virtual object to initiate an attack. However, by applying this solution, after detecting that the user clicks/taps any skill, the terminal can automatically trigger a virtual prop corresponding to the skill, and the user does not need to perform manual click/tap.

402. The terminal detects a selection operation on a target skill, and determines a triggering mechanism corresponding to the target skill based on the target configuration file.

The target skill is used for adjusting the action effect of the target virtual prop to a target action effect. For example, if the action effect of the target virtual prop is reducing a health point of an attacked virtual object by 10%, the target action effect may be reducing the health point of the attacked virtual object by 30%, that is, use of the target skill can enhance the action effect of the target virtual prop.

In one embodiment, the terminal can detect a touch operation of the user in real time, and determine, in response to detecting a click/tap or touch and hold operation of the user on the selection control of the target skill, that a selection operation on the target skill of the target virtual prop is detected.

In one embodiment, in response to the selection operation on the target skill, the terminal can obtain a skill identifier of the target skill, and compare the skill identifier of the target skill and a skill identifier included in the target configuration file. When the target configuration file includes the skill identifier of the target skill, the terminal determines a triggering mechanism corresponding to the target skill as automatic triggering, that is, the terminal can automatically trigger, through the auxiliary attack, the target virtual prop corresponding to the target skill, to complete cast of the target skill, that is, complete use of the target virtual prop to attack another virtual object. When the target configuration file does not include the skill identifier of the target skill, the terminal can determine a triggering mechanism corresponding to the target skill as manual triggering, and the terminal needs to continue to monitor the triggering operation of the user on the target virtual prop. In this embodiment, description is made by using an only example in which the triggering mechanism corresponding to the target skill is automatic triggering, that is, the target effective duration is greater than 0.

403. The terminal determines, in response to detecting the selection operation on the target skill, an attacked target virtual object in the virtual scene.

In this embodiment, the virtual scene displays a plurality of second virtual objects, and the terminal can determine the target virtual object from the plurality of second virtual objects. In one embodiment, a process in which the terminal determines the target virtual object includes any one of the following implementations:

First implementation—The terminal determines the second virtual object designated by the user as the target virtual object. In one embodiment, the terminal determines, in response to detecting a selection operation on any second virtual object in the virtual scene in a target time period, the selected second virtual object as the target virtual object, that is, the target virtual object is an active target, and the active target is a target selected by the user. In some embodiments, the target time period is set by the developer. For example, a time period between a previous action moment of the target virtual prop and a current action moment is determined as the target time period, or the target time period is set to a fixed value, for example, a time period between 1 second before the current moment and 0.5 second after the current moment is set to the target time period. The implementation is not limited by the embodiments described in this application.

Second implementation—The terminal determines the second virtual object meeting a preset condition as the target virtual object. In one embodiment, the terminal determines, in response to detecting no selection operation on any second virtual object in the virtual scene in a target time period, a second virtual object that the target virtual prop previously acts on as the second virtual object meeting the preset condition, that is, determines the second virtual object that the target virtual prop previously acts on as the target virtual object. In one embodiment, the terminal can further first obtain an action moment at which the target virtual prop previously acts. If a duration between the action moment and a current moment is less than a target effective duration, the terminal determines a second virtual object that the target virtual prop previously acts on as the target virtual object, that is, the target virtual object is a tagged target. Certainly, in another possible implementation, the preset condition may alternatively be set to other content. The implementation is not limited by the embodiments described in this application. By applying the foregoing solution, the terminal can automatically determine an attacked target virtual object, and the user does not need to perform manual selection, thereby simplifying operation steps of the user; and when the user performs a continuous quick attack, the user does not need to quickly accurately select the target virtual object, thereby reducing operation difficulty, effectively improving man-machine interaction efficiency, and improving user experience.

In one embodiment, the terminal can highlight the target virtual object. For example, the terminal uses a target pattern to circle a location of the target virtual object, so that the user constantly pays attention to an attacked target. In some embodiments, the target pattern is also referred to as a target shape. In some embodiments, the target pattern is set by the developer. In some embodiments, the target pattern can be further displayed in a target color, for example, the target pattern may be displayed in yellow. The implementation is not limited by the embodiments described in this application.

Figure 5:
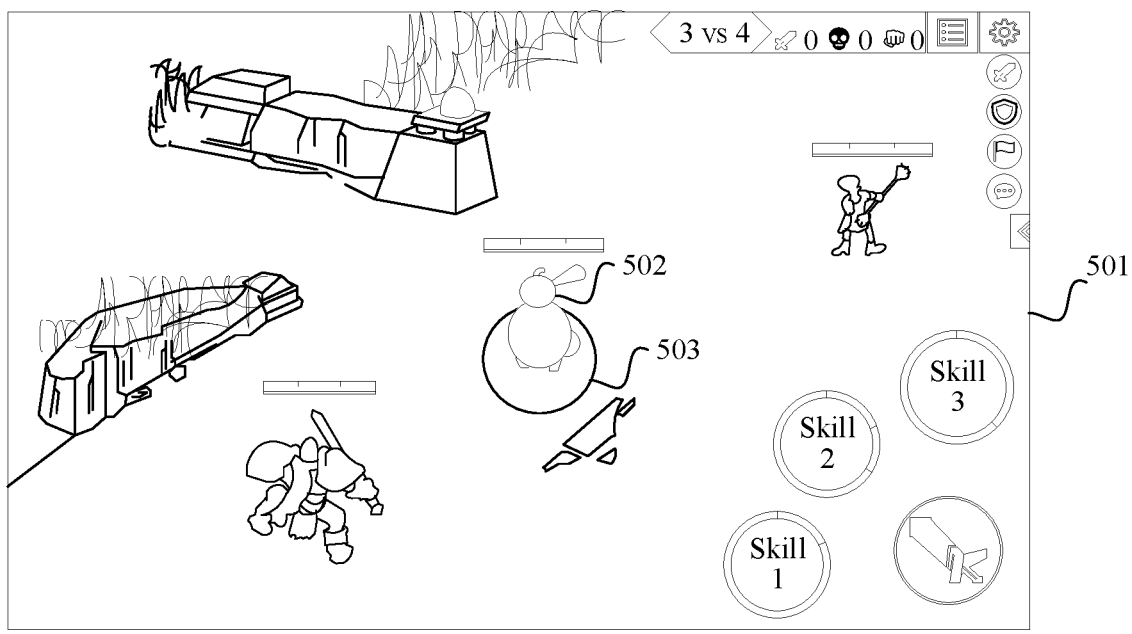
FIG. 5 is a schematic diagram of a target virtual object display method according to an embodiment of this application.

FIG. 5 is a schematic diagram of a target virtual object display method according to an embodiment of this application. Referring to FIG. 5, an operation interface 501 displays a target virtual object 502, and a location of the target virtual object 502 is circled by the target pattern, that is, circled by a circle 503. In one embodiment, the terminal can alternatively highlight the target virtual object manually selected by the user, that is, the active target, and circle the location of the active target in the virtual scene. In one embodiment, the terminal can further use target patterns in different colors to respectively circle the active target and the tagged target in the virtual scene, to differentiate between the active target and the tagged target. The foregoing description of the method for highlighting the target virtual object is merely an example description. This example of this application sets no limitation on a method for highlighting the target virtual object.

404. The terminal determines a location of the target virtual object and an action region of a target virtual prop.

In one embodiment, the terminal can detect a location of each virtual object in the virtual scene in real time. The terminal can determine the action region of the target virtual prop based on the location of the first virtual object. For example, using the location of the first virtual object as a center of a circle, the terminal determines the action region in the virtual scene. In some embodiments, the radius of the action region may be set by the developer. The implementation is not limited by the embodiments described in this application.

405. The terminal triggers, in response to the target virtual object being in an action region of the target virtual prop, the target virtual prop to perform an automatic attack mode.

In this embodiment, when detecting that the target virtual object is in the action region of the target virtual prop, the terminal determines the target virtual object as an object that can perform an attack. The terminal reads a prop identifier of the virtual prop corresponding to the target skill from the configuration file of the application program, the prop identifier being used for indicating the target virtual prop. The terminal triggers the target virtual prop to perform an automatic attack mode, that is, automatically controls the first virtual object to use the target virtual prop to perform an attack. In one embodiment, the terminal can simulate clicking/tapping the selection control corresponding to the target virtual prop, to trigger the first virtual object to use the target virtual prop to perform an attack on the target virtual object, and generate the target action effect on the target virtual object, thereby automatically trigger the target virtual prop, and automatically controlling the first virtual object to initiate an attack.

Using an example in which this solution is applicable to a MOBA game, without using a target skill, the target virtual prop corresponds to an ordinary attack; and after use of the target skill, the target virtual prop corresponds to an enhanced ordinary attack, and an action effect of the enhanced ordinary attack is a target action effect. After determining that the target virtual object may be attacked, the terminal can automatically trigger the target virtual prop on a next moment, to control the first virtual object to initiate an enhanced ordinary attack on the target virtual object, and generate the target action effect on the target virtual object. In some embodiments, the terminal can display a visual effect corresponding to the enhanced ordinary attack in the virtual scene.

In this embodiment, in a case that a previous action process of the target virtual prop has not been completed, that is, a previous ordinary attack process has not been completed, in response to that the selection operation of the user on the target skill is detected and the target virtual object may perform an attack, the terminal can stop the previous action process, and automatically trigger the target virtual prop to perform an automatic attack mode, that is, automatically trigger the current enhanced ordinary attack. That is, the terminal obtains, in response to the target virtual object being in the action region of the target virtual prop, an action moment at which the target virtual prop previously acts and an action duration of the target virtual prop. The terminal stops, in response to a duration between a current moment and the action moment being less than the action duration, a previous action process of the target virtual prop, and triggers the target virtual prop to perform the automatic attack mode. By applying the foregoing solution, the terminal can automatically interrupt the previous ordinary attack, and perform the enhanced ordinary attack in time, to make the interaction process smoother.

In this embodiment, in a case that the first virtual object is currently in a movement state, in response to that the selection operation of the user on the target skill is detected and the target virtual object may perform an attack, the terminal can stop movement of the first virtual object, and automatically trigger the target virtual prop to perform an automatic attack mode, that is, automatically trigger the current enhanced ordinary attack. That is, the terminal obtains, in response to the target virtual object being in the action region of the target virtual prop, an action state of the first virtual object. The terminal stops, in response to the action state of the first virtual object being a movement state, movement of the first virtual object, and triggers the target virtual prop to perform the automatic attack mode. By applying the foregoing solution, the terminal can automatically interrupt movement of the virtual object, and perform the current enhanced ordinary attack in time, that is, cast the target skill in time, thereby improving the attack speed, to achieve a good attack effect, optimize the interaction process, and further improve user experience.

In the technical solution provided in this embodiment, a selection operation on a target skill is detected in a virtual scene, and the action effect of the target virtual prop is adjusted to a target action effect by the target skill; and an attacked target virtual object is determined in the virtual scene, and when the target virtual object is in an action region of the target virtual prop, the target virtual prop is automatically triggered, to enable the first virtual object controlled by the user to use the target virtual prop to automatically initiate an attack on the target virtual object, to generate the target action effect on the target virtual object. By applying this solution, after completing skill selection, the user does not need to manually trigger the target virtual prop, thereby simplifying operation steps of the user, and improving operation efficiency, that is, improving man-machine interaction efficiency, so that user experience is greatly improved.

Figure 6:
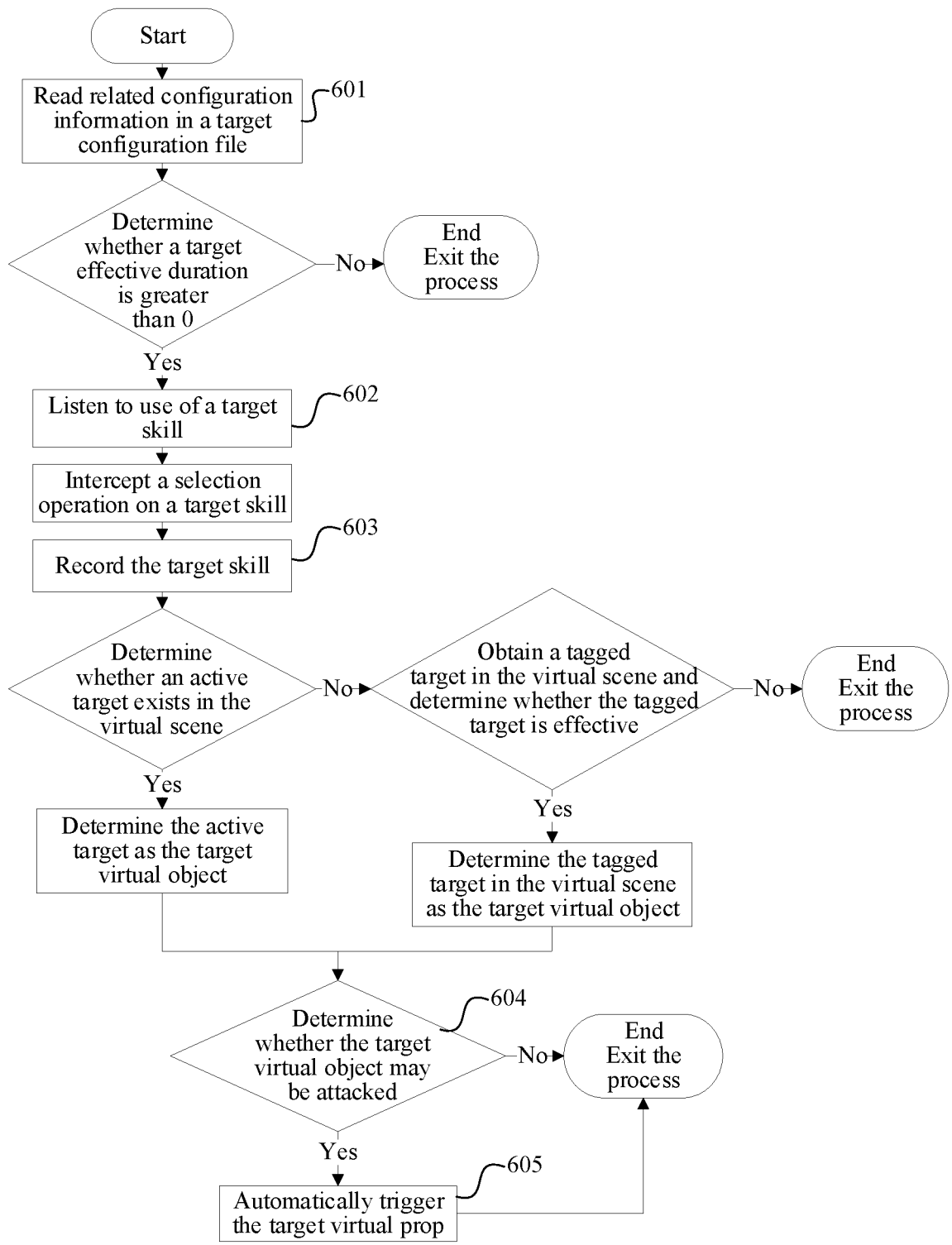
FIG. 6 is a schematic diagram of an automatic triggering process of a virtual prop according to an embodiment of this application.

Using an example in which the foregoing solution is applicable to the MOBA game, the foregoing virtual object control method is described with reference to FIG. 6. FIG. 6 is a schematic diagram of an automatic triggering process of a virtual prop according to an embodiment of this application. Referring to FIG. 6, in response to round start of the game, the terminal can perform step 601 of reading related configuration information in a target configuration file, to determine whether a target effective duration is greater than 0. In a case that the target effective duration is greater than 0, the terminal performs step 602 of listening to use of a target skill; and in a case that a selection operation on the target skill is intercepted, the terminal can perform step 603 of recording the target skill. The terminal records a skill identifier of the target skill and a current moment. At a next moment, the terminal determines a target virtual object. For example, the terminal can first determine whether an active target, that is, a virtual object manually selected by the user exists in the virtual scene; and if yes, determine the active target as the target virtual object, and preferentially attack the active target. If not, the terminal can obtain a tagged target in the virtual scene, and determine whether the tagged target is effective, that is, whether the current moment is in the target effective duration; and in a case that the tagged target is effective, determine the tagged target in the virtual scene as the target virtual object. The terminal can continue to perform step 604 of determining whether the target virtual object may be attacked, that is, determining whether the target virtual object is in an action region of the target virtual prop. In a case that the target virtual prop is in the action region of the target virtual prop, that is, the target virtual object may be attacked, the terminal performs step 605 of automatically triggering the target virtual prop.

By applying the foregoing solution, in an aspect, a current attacked target virtual object is automatically determined based on a previous attack, thereby improving attack accuracy; and in another aspect, a target virtual object is automatically determined and a target virtual prop is automatically triggered, to automatically control the first virtual object to use the target virtual prop to perform an attack on the target virtual object, thereby effectively simplifying operations of the user, reducing operation difficulty of the game, and improving user experience.

Figure 7:
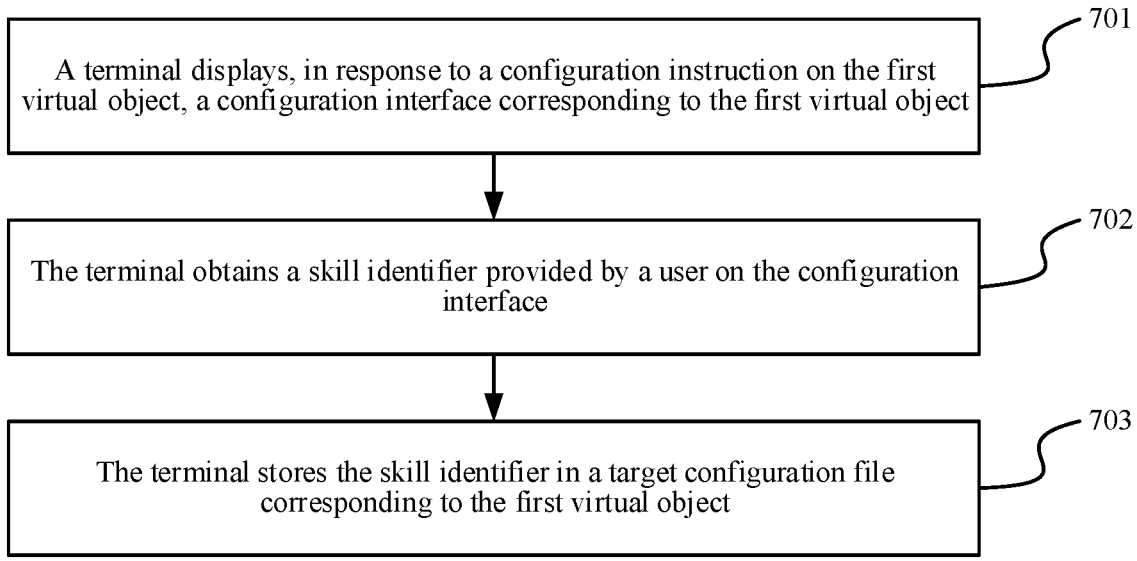
FIG. 7 is a flowchart of a configuration method for triggering a virtual prop according to an embodiment of this application.

The foregoing embodiment describes a process in which when it is detected that the user selects a target skill, the first virtual object is automatically triggered to use the target virtual prop to perform interaction. In the foregoing process, a triggering mechanism of a virtual prop corresponding to each skill may be configured by the developer, to store the configuration information in the target configuration file, or the triggering mechanism may be configured by the user, to determine a skill to which a virtual prop that needs to be manually triggered corresponds, and a skill to which a virtual prop that may be automatically triggered corresponds. FIG. 7 is a flowchart of a configuration method for triggering a virtual prop according to an embodiment of this application. Referring to FIG. 7, using an example in which the first virtual object is configured, the method may specifically include the following steps:

701. A terminal displays, in response to a configuration instruction on the first virtual object, a configuration interface corresponding to the first virtual object.

Figure 8:
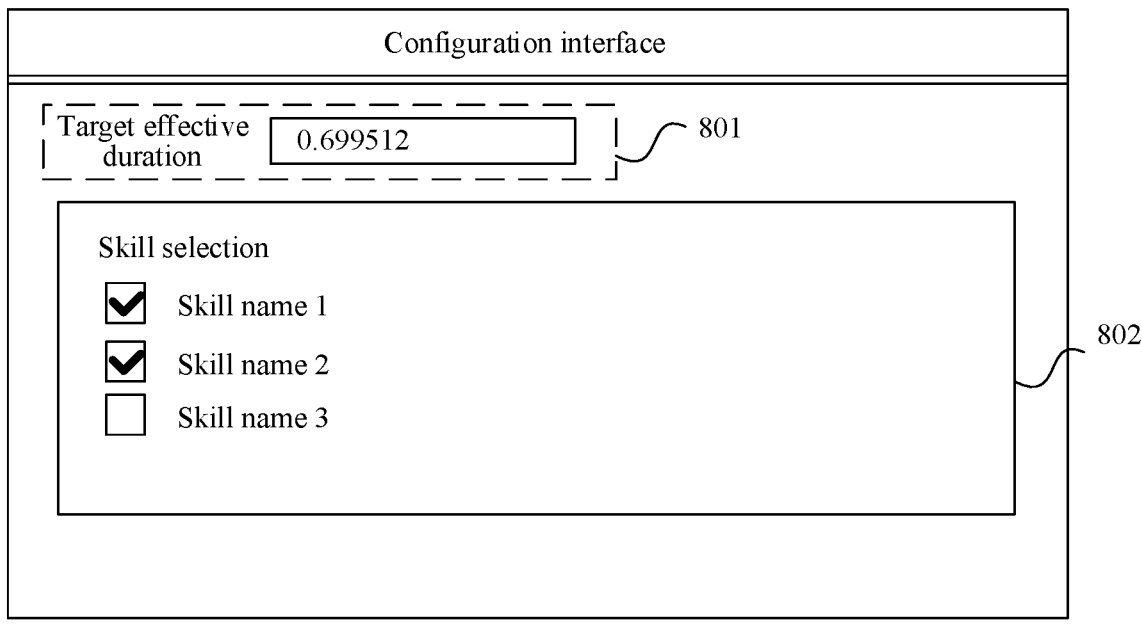
FIG. 8 is a schematic diagram of a configuration interface according to an embodiment of this application.

In one embodiment, a triggering operation of the user on a configuration control corresponding to the first virtual object can trigger the configuration instruction, and certainly, the configuration instruction can alternatively be triggered in another manner. The implementation is not limited by the embodiments described in this application. The terminal displays, in response to the configuration instruction triggered by the user, the configuration interface corresponding to the first virtual object. FIG. 8 is a schematic diagram of a configuration interface according to an embodiment of this application. Referring to FIG. 8, the configuration interface includes a target effective duration setting region 801 and a skill selection region 802, the user can enter a value into the target effective duration setting region 801 as the target effective duration, the skill selection region 802 may display a skill selection control 803 corresponding to the first virtual object, and the skill selection control 803 displays a skill name.

702. The terminal obtains a skill identifier provided by a user on the configuration interface.

In one embodiment, in response to detecting a selection operation of the user on any skill selection control, the terminal can obtain a skill identifier of a skill corresponding to the any skill selection control.

703. The terminal stores the skill identifier in a target configuration file corresponding to the first virtual object.

In one embodiment, the terminal can store the obtained at least one skill identifier in the target configuration file. In one embodiment, the terminal can further store the target effective duration entered by the user in the target configuration file. In another possible implementation, the target effective duration can alternatively be set by the developer to a default value. The implementation is not limited by the embodiments described in this application.

Figure 9:
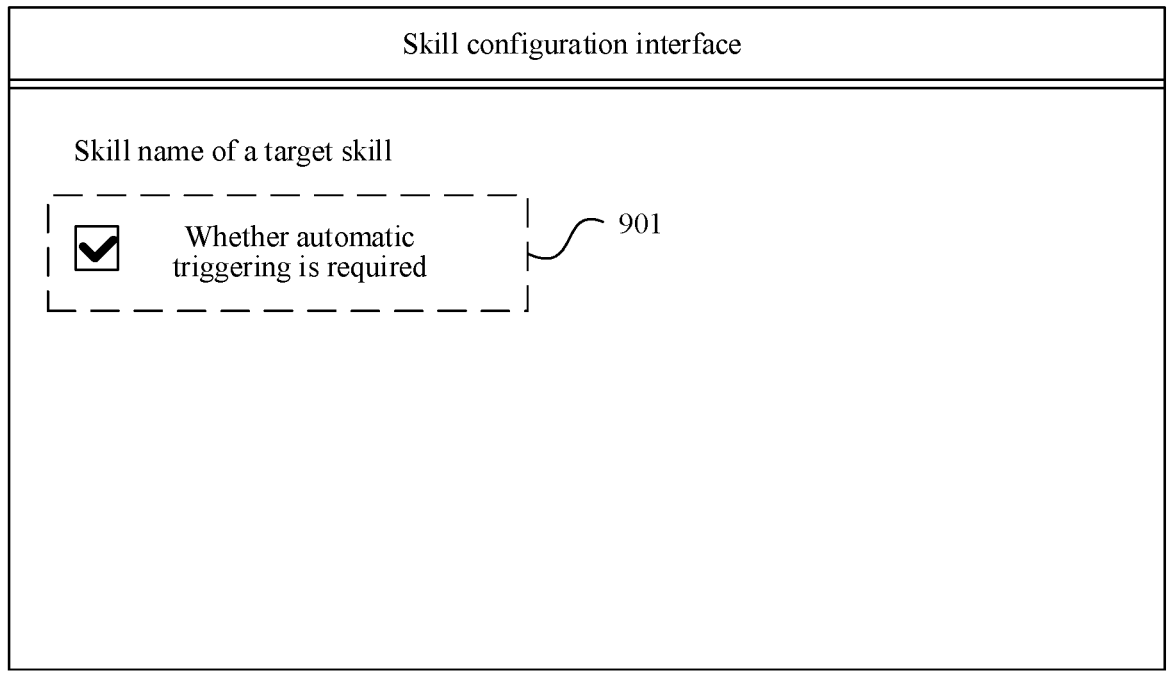
FIG. 9 is a schematic diagram of a skill configuration interface according to an embodiment of this application.

The foregoing description on the triggering mechanism configuration method is only exemplary. In one embodiment, the user can further configure, on a skill configuration interface corresponding to each skill, a method of triggering a virtual prop corresponding to each skill. FIG. 9 is a schematic diagram of a skill configuration interface according to an embodiment of this application. Referring to FIG. 9, using an example in which a target skill is configured, the skill configuration interface displays a selection control 901 about whether a target virtual prop corresponding to the target skill needs to be automatically triggered, that is, displays a selection control about whether the target skill requires an auxiliary attack. In a case that the user selects the selection control, the terminal can determine that the target virtual prop corresponding to the target skill can be automatically triggered, that is, the target skill requires the auxiliary attack, and the terminal can obtain the skill identifier of the target skill, and store the skill identifier in the target configuration file. A specific configuration method is not limited by this embodiment.

By applying the foregoing solution, the user can autonomously configure a skill that can be automatically triggered through a virtual prop. That is, the user can identify which skill requires an auxiliary attack and configure the identified skill, thereby enlarging the selection range of the user, and making operations of the application program user friendly.

The above technical solutions may be combined randomly to form various embodiments of this application. Details are not repeated herein.

Figure 10:
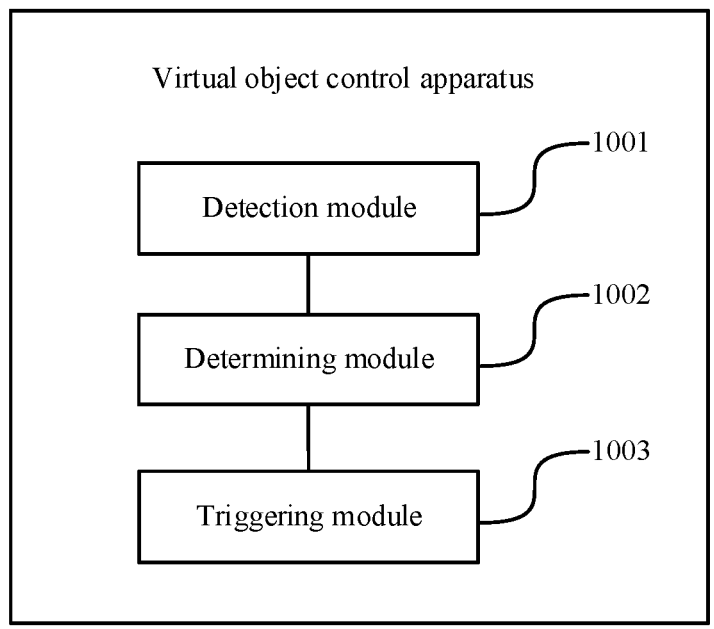
FIG. 10 is a schematic structural diagram of a virtual object control apparatus according to an embodiment of this application.

FIG. 10 is a schematic structural diagram of a virtual object control apparatus according to an embodiment of this application. Referring to FIG. 10, the apparatus includes:
- a detecting module 1001, configured to detect a selection operation on a target skill, the target skill being used for adjusting an action effect of a target virtual prop to a target action effect, the target virtual prop being a virtual prop of a first virtual object, and the first virtual object being a virtual object controlled by a terminal;
- a determining module 1002, configured to determine, in response to detecting the selection operation on the target skill, a target virtual object in a virtual scene, the target virtual object being an action target of the target virtual prop; and
- a triggering module 1003, configured to trigger, in response to the target virtual object being in an action region of the target virtual prop, the target virtual prop to perform an automatic attack mode, the automatic attack mode being to automatically initiate, in a case of detecting no triggering operation on the target virtual prop, an attack on the target virtual object, to generate the target action effect on the target virtual object.

In one embodiment, the determining module 1002 is configured to:
- determine, in response to detecting a selection operation on any second virtual object in the virtual scene in a target time period, the selected second virtual object as the target virtual object; and
- determine, in response to detecting no selection operation on any second virtual object in the virtual scene in a target time period, a second virtual object that the target virtual prop previously acts on as the target virtual object.

In one embodiment, the apparatus further includes:
- an obtaining module, configured to obtain an action moment at which the target virtual prop previously acts,
- the determining module 1002 being configured to perform, in response to a duration between the action moment and a current moment being less than a target effective duration, the operation of determining a second virtual object that the target virtual prop previously acts on as the target virtual object.

In one embodiment, the apparatus further includes:
- a retrieving module, configured to read a target configuration file corresponding to the first virtual object,
- the determining module 1002 being configured to: determine, based on configuration information in the target configuration file, a triggering mechanism corresponding to the target skill; trigger, in a case that the triggering mechanism corresponding to the target skill is automatic triggering, the target virtual prop to perform the automatic attack mode; and trigger, in a case that the triggering mechanism corresponding to the target skill is manual triggering, the target virtual prop in response to detecting a triggering operation on the target virtual prop.

In one embodiment, the target configuration file stores a target effective duration, the target effective duration being used for indicating the triggering mechanism corresponding to the target skill.

In one embodiment, the determining module 1002 is configured to:
- obtain the target effective duration from the target configuration file; and
- determine, in a case that the target effective duration is greater than 0, the triggering mechanism corresponding to the target skill as automatic triggering; otherwise, determine the triggering mechanism corresponding to the target skill as manual triggering.

In one embodiment, the triggering module 1003 is configured to:
- obtain, in response to the target virtual object being in the action region of the target virtual prop, an action moment at which the target virtual prop previously acts and an action duration of the target virtual prop; and
- stop, in response to a duration between a current moment and the action moment being less than the action duration, a previous action process of the target virtual prop, and trigger the target virtual prop to perform the automatic attack mode.

In one embodiment, the triggering module 1003 is configured to:
- obtain, in response to the target virtual object being in the action region of the target virtual prop, an action state of the first virtual object; and
- stop, in response to the action state of the first virtual object being a movement state, movement of the first virtual object, and trigger the target virtual prop to perform the automatic attack mode.

In one embodiment, the apparatus further includes:
- a display module, configured to display, in response to a configuration instruction on the first virtual object, a configuration interface corresponding to the first virtual object,
- the obtaining module being configured to obtain a skill identifier provided by a user on the configuration interface, the skill identifier being used for indicating the target skill; and
- the apparatus further includes a storage module, configured to store the skill identifier in a target configuration file corresponding to the first virtual object.

Based on the apparatus provided in this embodiment, a selection operation on a target skill is detected, and the action effect of the target virtual prop is adjusted to a target action effect; and an attacked target virtual object is determined in a virtual scene, and when the target virtual object is in an action region of the target virtual prop, the target virtual prop is automatically triggered, to cause the first virtual object controlled by the user to use the target virtual prop to automatically initiate an attack on the target virtual object, to generate the target action effect on the target virtual object. By applying this solution, after completing skill selection, the user does not need to manually trigger the target virtual prop, thereby simplifying operation steps of the user, and improving operation efficiency, that is, improving man-machine interaction efficiency, so that user experience is greatly improved.

When the virtual object control apparatus provided in the foregoing embodiment controls the virtual object, only division of the foregoing function modules is used as an example for description. In one embodiment, the functions may be allocated to and completed by different function modules according to requirements. That is, an internal structure of the apparatus is divided into different function modules, to complete all or some of the functions described above. In addition, the virtual object control apparatus and the virtual object control method provided in the foregoing embodiments belong to the same concept. For a specific implementation process, refer to the method embodiment, and details are not described herein again.

The terminal or server provided in the foregoing technical solutions is collectively referred to as a computer device, for example, the computer device includes one or more processors and one or more memories storing at least one piece of program code, the at least one piece of program code being loaded and executed by the one or more processors to implement the following operations:

detecting a selection operation on a target skill, the target skill being used for adjusting an action effect of a target virtual prop to a target action effect, the target virtual prop being a virtual prop of a first virtual object, and the first virtual object being a virtual object controlled by a terminal;

determining, in response to detecting the selection operation on the target skill, a target virtual object in a virtual scene, the target virtual object being an action target of the target virtual prop; and triggering, in response to the target virtual object being in an action region of the target virtual prop, the target virtual prop to perform an automatic attack mode, the automatic attack mode being to automatically initiate, in a case of detecting no triggering operation on the target virtual prop, an attack on the target virtual object, to generate the target action effect on the target virtual object.

In one embodiment, the at least one piece of program code is loaded and executed by the one or more processors to implement the following operations:

determining, in response to detecting a selection operation on any second virtual object in the virtual scene in a target time period, the selected second virtual object as the target virtual object; and determining, in response to detecting no selection operation on any second virtual object in the virtual scene in a target time period, a second virtual object that the target virtual prop previously acts on as the target virtual object.

In one embodiment, the at least one piece of program code is loaded and executed by the one or more processors to implement the following operations:

obtaining an action moment at which the target virtual prop previously acts; and performing, in response to a duration between the action moment and a current moment being less than a target effective duration, the operation of determining a second virtual object that the target virtual prop previously acts on as the target virtual object.

In one embodiment, the at least one piece of program code is loaded and executed by the one or more processors to implement the following operations:

reading a target configuration file corresponding to the first virtual object;

determining, based on configuration information in the target configuration file, a triggering mechanism corresponding to the target skill;

triggering, in a case that the triggering mechanism corresponding to the target skill is automatic triggering, the target virtual prop to perform the automatic attack mode; and triggering, in a case that the triggering mechanism corresponding to the target skill is manual triggering, the target virtual prop in response to detecting a triggering operation on the target virtual prop.

In one embodiment, the target configuration file stores a target effective duration, the target effective duration being used for indicating the triggering mechanism corresponding to the target skill.

In one embodiment, the at least one piece of program code is loaded and executed by the one or more processors to implement the following operations:

obtaining the target effective duration from the target configuration file; and determining, in a case that the target effective duration is greater than 0, the triggering mechanism corresponding to the target skill as automatic triggering; otherwise, determining the triggering mechanism corresponding to the target skill as manual triggering.

In one embodiment, the at least one piece of program code is loaded and executed by the one or more processors to implement the following operations:

obtaining, in response to the target virtual object being in the action region of the target virtual prop, an action moment at which the target virtual prop previously acts and an action duration of the target virtual prop; and stopping, in response to a duration between a current moment and the action moment being less than the action duration, a previous action process of the target virtual prop, and triggering the target virtual prop to perform the automatic attack mode.

In one embodiment, the at least one piece of program code is loaded and executed by the one or more processors to implement the following operations:

obtaining, in response to the target virtual object being in the action region of the target virtual prop, an action state of the first virtual object; and stopping, in response to the action state of the first virtual object being a movement state, movement of the first virtual object, and triggering the target virtual prop to perform the automatic attack mode.

In one embodiment, the at least one piece of program code is loaded and executed by the one or more processors to implement the following operations:

displaying, in response to a configuration instruction on the first virtual object, a configuration interface corresponding to the first virtual object;

obtaining a skill identifier provided by a user on the configuration interface, the skill identifier being used for indicating the target skill; and storing the skill identifier in a target configuration file corresponding to the first virtual object.

Figure 11:
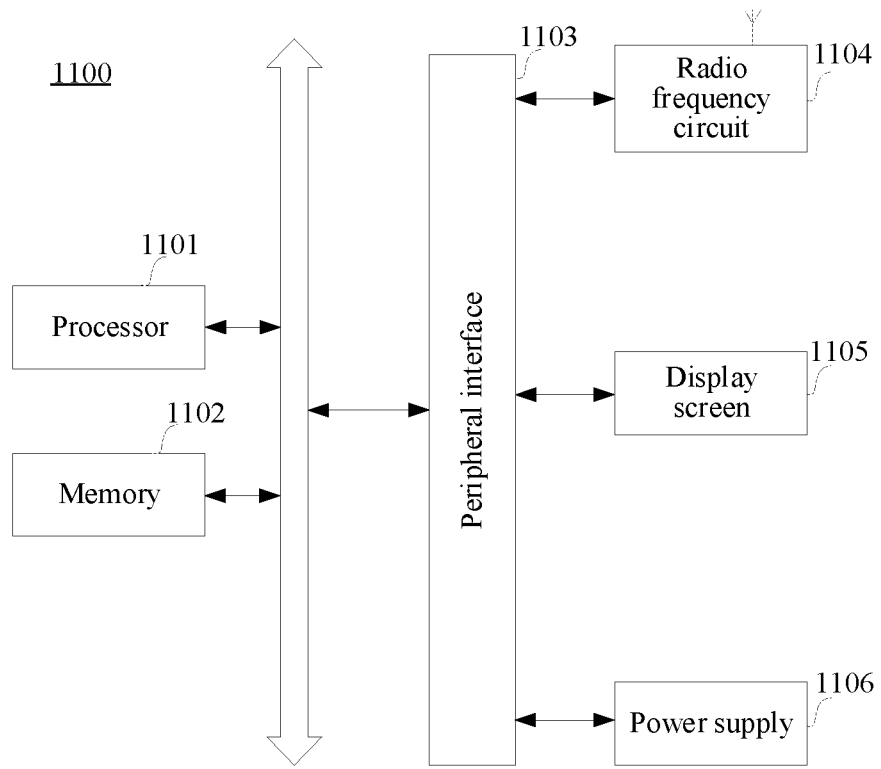
FIG. 11 is a schematic structural diagram of a terminal according to an embodiment of this application.

A description is made below by using an example in which the computer device is a terminal. FIG. 11 is a schematic structural diagram of a terminal according to an embodiment of this application. The terminal 1100 may be a smartphone, a tablet computer, a Moving Picture Experts Group Audio Layer III (MP3) player, a Moving Picture Experts Group Audio Layer IV (MP4) player, a notebook computer or a desktop computer. The terminal 1100 may also be referred to as another name such as user equipment, a portable terminal, a laptop terminal, or a desktop terminal.

Generally, the terminal 1100 includes one or more processors 1101 and one or more memories 1102.

The processor 1101 may include one or more processing cores, for example, a 4-core processor or an 8-core processor. The processor 1101 may be implemented in at least one hardware form of a digital signal processor (DSP), a field-programmable gate array (FPGA), and a programmable logic array (PLA).

The memory 1102 may include one or more computer-readable storage media. The computer-readable storage medium may be non-transient. The memory 1102 may further include a high-speed random access memory and a non-volatile memory such as one or more magnetic disk storage devices and a flash storage device. In some embodiments, a non-transient computer-readable storage medium in the memory 1102 is configured to store at least one piece of program code, and the at least one piece of program code is configured to be executed by the processor 1101 to implement the virtual object control method provided in the method embodiments of this application.

In some embodiments, the terminal 1100 may In some embodiments include a peripheral interface 1103 and at least one peripheral. The processor 1101, the memory 1102, and the peripheral interface 1103 may be connected through a bus or a signal cable. Each peripheral may be connected to the peripheral interface 1103 through a bus, a signal cable, or a circuit board. Specifically, the peripheral device includes at least one of a radio frequency circuit 1104, a display screen 1105, and a power supply 1106.

The peripheral interface 1103 may be configured to connect the at least one peripheral related to input/output (I/O) to the processor 1101 and the memory 1102. In some embodiments, the processor 1101, the memory 1102, and the peripheral interface 1103 are integrated on the same chip or the same circuit board. In some other embodiments, any one or two of the processor 1101, the memory 1102, and the peripheral interface 1103 may be implemented on an independent chip or circuit board. This is not limited in this embodiment.

The RF circuit 1104 is configured to receive and transmit an RF signal, which is also referred to as an electromagnetic signal. The radio frequency circuit 1104 communicates with a communication network and another communication device by using the electromagnetic signal. The RF circuit 1104 converts an electric signal into an electromagnetic signal for transmission, or converts a received electromagnetic signal into an electric signal.

The display screen 1105 is configured to display a user interface (UI). The UI may include a graph, a text, an icon, a video, and any combination thereof. When the display screen 1105 is a touch display screen, the display screen 1105 further has a capability of acquiring a touch signal on or above a surface of the display screen 1105. The touch signal may be inputted to the processor 1101 for processing as a control signal. The display screen 1105 may be prepared by using materials such as a liquid crystal display (LCD), an organic light-emitting diode (OLED), or the like.

The power supply 1106 is configured to supply power to assemblies in the terminal 1100. The power supply 1106 may be an alternating current, a direct current, a disposable battery, or a rechargeable battery. When the power supply 1106 includes a rechargeable battery, the rechargeable battery supports wired charging or wireless charging. The rechargeable battery may further be configured to support a quick charge technology.

A person skilled in the art may understand that the structure shown in FIG. 11 does not constitute a limitation on the terminal 1100, and the terminal may include more or fewer components than those shown in the figure, or some components may be combined, or a different component deployment may be used.

Figure 12:
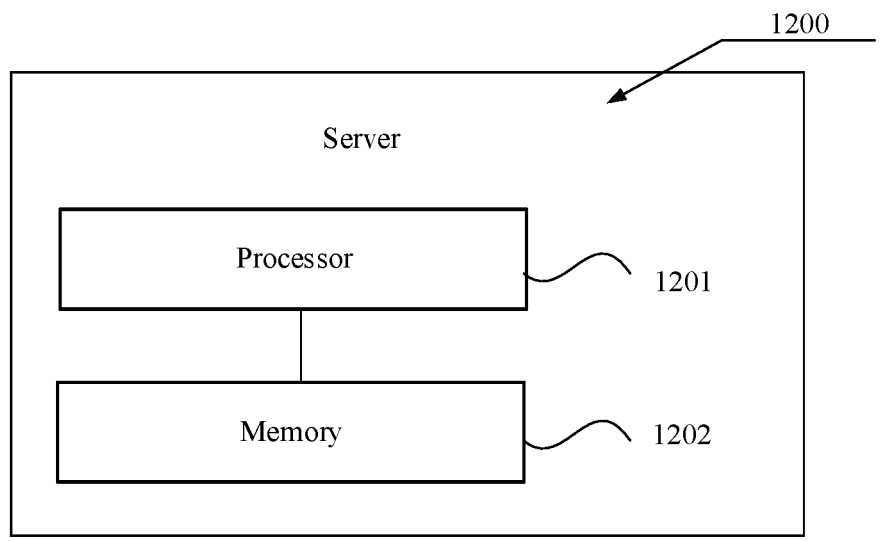
FIG. 12 is a schematic structural diagram of a server according to an embodiment of this application.

A description is made below by using an example in which the computer device is a server. FIG. 12 is a schematic structural diagram of a server according to an embodiment of this application. The server 1200 may vary greatly because a configuration or performance varies, and may include one or more central processing units (CPU) 1201 and one or more memories 1202. The one or more memories 1202 store at least one piece of program code, and the at least one piece of program code is loaded and executed by the one or more processors 1201 to implement the methods provided in the foregoing various method embodiments. Certainly, the server 1200 may also have a wired or wireless network interface, a keyboard, an input/output interface and other components to facilitate input/output. The server 1200 may also include other components for implementing device functions. Details are not described herein.

In an exemplary embodiment, a computer-readable storage medium, for example, a memory including at least one piece of program code is further provided. The at least one piece of program code may be executed by a processor to implement the virtual object control method in the foregoing embodiments. For example, the computer-readable storage medium may be a read-only memory (ROM), a RAM, a compact disc ROM (CD-ROM), a magnetic tape, a floppy disk, an optical data storage device, or the like.

The at least one piece of program code is loaded and executed by the one or more processors to implement the following operations:

detecting a selection operation on a target skill, the target skill being used for adjusting an action effect of a target virtual prop to a target action effect, the target virtual prop being a virtual prop of a first virtual object, and the first virtual object being a virtual object controlled by a terminal;

determining, in response to detecting the selection operation on the target skill, a target virtual object in a virtual scene, the target virtual object being an action target of the target virtual prop; and triggering, in response to the target virtual object being in an action region of the target virtual prop, the target virtual prop to perform an automatic attack mode, the automatic attack mode being to automatically initiate, in a case of detecting no triggering operation on the target virtual prop, an attack on the target virtual object, to generate the target action effect on the target virtual object.

In one embodiment, the at least one piece of program code is loaded and executed by the one or more processors to implement the following operations:

determining, in response to detecting a selection operation on any second virtual object in the virtual scene in a target time period, the selected second virtual object as the target virtual object; and determining, in response to detecting no selection operation on any second virtual object in the virtual scene in a target time period, a second virtual object that the target virtual prop previously acts on as the target virtual object.

In one embodiment, the at least one piece of program code is loaded and executed by the one or more processors to implement the following operations:

obtaining an action moment at which the target virtual prop previously acts; and performing, in response to a duration between the action moment and a current moment being less than a target effective duration, the operation of determining a second virtual object that the target virtual prop previously acts on as the target virtual object.

In one embodiment, the at least one piece of program code is loaded and executed by the one or more processors to implement the following operations:

reading a target configuration file corresponding to the first virtual object;

determining, based on configuration information in the target configuration file, a triggering mechanism corresponding to the target skill;

triggering, in a case that the triggering mechanism corresponding to the target skill is automatic triggering, the target virtual prop to perform the automatic attack mode; and triggering, in a case that the triggering mechanism corresponding to the target skill is manual triggering, the target virtual prop in response to detecting a triggering operation on the target virtual prop.

In one embodiment, the target configuration file stores a target effective duration, the target effective duration being used for indicating the triggering mechanism corresponding to the target skill.

In one embodiment, the at least one piece of program code is loaded and executed by the one or more processors to implement the following operations:

obtaining the target effective duration from the target configuration file; and determining, in a case that the target effective duration is greater than 0, the triggering mechanism corresponding to the target skill as automatic triggering; otherwise, determining the triggering mechanism corresponding to the target skill as manual triggering.

In one embodiment, the at least one piece of program code is loaded and executed by the one or more processors to implement the following operations:

obtaining, in response to the target virtual object being in the action region of the target virtual prop, an action moment at which the target virtual prop previously acts and an action duration of the target virtual prop; and stopping, in response to a duration between a current moment and the action moment being less than the action duration, a previous action process of the target virtual prop, and triggering the target virtual prop to perform the automatic attack mode.

In one embodiment, the at least one piece of program code is loaded and executed by the one or more processors to implement the following operations:

obtaining, in response to the target virtual object being in the action region of the target virtual prop, an action state of the first virtual object; and stopping, in response to the action state of the first virtual object being a movement state, movement of the first virtual object, and triggering the target virtual prop to perform the automatic attack mode.

In one embodiment, the at least one piece of program code is loaded and executed by the one or more processors to implement the following operations:

displaying, in response to a configuration instruction on the first virtual object, a configuration interface corresponding to the first virtual object;

obtaining a skill identifier provided by a user on the configuration interface, the skill identifier being used for indicating the target skill; and storing the skill identifier in a target configuration file corresponding to the first virtual object.

The term module, and other similar terms such as subunit, unit, submodule, etc., in this disclosure may refer to a software unit, a hardware unit, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each unit can be part of an overall module that includes the functionalities of the module.

In some embodiments, a computer program or computer program product including at least one piece of program code is further provided, the computer program or computer program product, when run on a computer device, causing the computer device to perform the virtual object control method provided in the foregoing embodiments. Details are not described herein.

A person of ordinary skill in the art may understand that all or some of the steps of the foregoing embodiments may be implemented by hardware, or may be implemented by at least one piece of program code of a program instructing relevant hardware. The program may be stored in a computer-readable storage medium. The storage medium may be a read-only memory, a magnetic disk, an optical disc, or the like.

The foregoing descriptions are merely embodiments of this application, but are not intended to limit this application. Any modification, equivalent replacement, or improvement made within the spirit and principle of this application shall fall within the protection scope of this application.

What is claimed is:

1. A virtual object control method, applicable to a computer device, the method comprising:

presenting a target virtual prop in a virtual scene, the target virtual prop being a virtual prop of a first virtual object configured to generate an ordinary action effect on a target when activated, the first virtual object being a virtual object controlled by a terminal, and generating the ordinary action effect on the target including making a first adjustment on a attribute value of the target related to fighting;

detecting a selection operation on a target skill, the target skill being configured to adjust the ordinary action effect of the target virtual prop to a target action effect, wherein generating the target action effect on the target includes making a second adjustment on the attribute value of the target related to fighting, the second adjustment being different from the first adjustment;

determining a target virtual object in the virtual scene in response to detecting the selection operation on the target skill; and triggering the target virtual prop to perform an attack that generates the target action effect on the target virtual object in response to the target virtual object being in an action region of the target virtual prop.

2. The method according to claim 1, wherein the determining a target virtual object in a virtual scene comprises:

determining a second virtual object as the target virtual object in response to detecting a selection operation on the second virtual object in the virtual scene in a target time period; or determining a second virtual object that the target virtual prop previously acted on before the selection operation on the target skill as the target virtual object in response to detecting no selection operation on any second virtual object in the virtual scene in a target time period.

3. The method according to claim 1, wherein the determining a target virtual object in the virtual scene comprises, in response to detecting no selection operation on any second virtual object in the virtual scene in a target time period:

obtaining an action moment at which the target virtual prop previously acted on before the selection operation of the target skill; and determining a second virtual object that the target virtual prop previously acted on as the target virtual object in response to a duration between the action moment and a current moment being less than a target effective duration.

4. The method according to claim 1, wherein the method further comprises:
retrieving a target configuration file corresponding to the first virtual object;
determining, based on configuration information in the target configuration file, a triggering mechanism corresponding to the target skill;
triggering the target virtual prop to perform the attack in an automatic attack mode when the triggering mechanism corresponding to the target skill is automatic triggering; and
triggering the target virtual prop to perform the attack in response to detecting a triggering operation on the target virtual prop when the triggering mechanism corresponding to the target skill is manual triggering.

5. The method according to claim 4, wherein the target configuration file stores a target effective duration, the target effective duration indicating the triggering mechanism corresponding to the target skill.

6. The method according to claim 5, wherein the determining, based on configuration information in the target configuration file, a triggering mechanism corresponding to the target skill comprises:
obtaining the target effective duration from the target configuration file; and
determining, when the target effective duration is greater than 0, the triggering mechanism corresponding to the target skill as automatic triggering; otherwise, determining the triggering mechanism corresponding to the target skill as manual triggering.

7. The method according to claim 1, wherein the triggering, in response to the target virtual object being in an action region of the target virtual prop, the target virtual prop to perform the attack comprises:
obtaining an action moment at which the target virtual prop previously acted and an action duration of the target virtual prop in response to the target virtual object being in the action region of the target virtual prop; and
stopping a previous action process of the target virtual prop, and triggering the target virtual prop to perform the attack in an automatic attack mode in response to a duration between a current moment and the action moment being less than the action duration.

8. The method according to claim 1, wherein the triggering, in response to the target virtual object being in an action region of the target virtual prop, the target virtual prop to perform the attack comprises:
obtaining, in response to the target virtual object being in the action region of the target virtual prop, an action state of the first virtual object; and
stopping, in response to the action state of the first virtual object being a movement state, movement of the first virtual object, and triggering the target virtual prop to perform the attack.

9. The method according to claim 1, further comprising:
displaying, in response to a configuration instruction on the first virtual object, a configuration interface corresponding to the first virtual object;
obtaining a skill identifier received on the configuration interface, the skill identifier indicating the target skill; and
storing the skill identifier in a target configuration file corresponding to the first virtual object.

10. A virtual object control apparatus, comprising: one or more processors and one or more memories storing at least one piece of program code, the one or more processors are configured to load and execute the at least one piece of program code to:
presenting a target virtual prop in a virtual scene, the target virtual prop being a virtual prop of a first virtual object configured to generate an ordinary action effect on a target when activated, the first virtual object being a virtual object controlled by a terminal, and generating the ordinary action effect on the target including making a first adjustment on a attribute value of the target related to fighting;
detect a selection operation on a target skill, the target skill being configured to adjust the ordinary action effect of the target virtual prop to a target action effect, wherein generating the target action effect on the target includes making a second adjustment on the attribute value of the target related to fighting, the second adjustment being different from the first adjustment;
determine a target virtual object in the virtual scene in response to detecting the selection operation on the target skill; and
trigger the target virtual prop to perform an attack that generates the target action effect on the target virtual object, in response to the target virtual object being in an action region of the target virtual prop.

11. The apparatus according to claim 10, wherein the one or more processors are further configured to:
determine a second virtual object as the target virtual object in response to detecting the selection operation on any second virtual object in the virtual scene in a target time period; or
determine a second virtual object that the target virtual prop previously acted on before the selection operation on the target skill as the target virtual object in response to detecting no selection operation on any second virtual object in the virtual scene in a target time period.

12. The apparatus according to claim 10, wherein the one or more processors are further configured to, in response to detecting no selection operation on any second virtual object in the virtual scene in a target time period:
obtain an action moment at which the target virtual prop previously acted on before the selection operation of the target skill,
determining a second virtual object that the target virtual prop previously acts on as the target virtual object in response to a duration between the action moment and a current moment being less than a target effective duration.

13. The apparatus according to claim 10, wherein the one or more processors are further configured to:
read a target configuration file corresponding to the first virtual object,
determine, based on configuration information in the target configuration file, a triggering mechanism corresponding to the target skill; trigger, when the triggering mechanism corresponding to the target skill is automatic triggering, the target virtual prop to perform the attack in an automatic attack mode; and trigger, when in a case that the triggering mechanism corresponding to the target skill is manual triggering, the target virtual prop to perform the attack in response to detecting a triggering operation on the target virtual prop.

14. A non-transitory computer-readable storage medium, storing at least one piece of program code, the at least one piece of program code being loaded and executed by a processor, to implement:
  presenting a target virtual prop in a virtual scene, the target virtual prop being a virtual prop of a first virtual object configured to generate an ordinary action effect on a target when activated, the first virtual object being a virtual object controlled by a terminal, and generating the ordinary action effect on the target including making a first adjustment on a attribute value of the target related to fighting;
  detecting a selection operation on a target skill, the target skill being configured to adjust the ordinary action effect of the target virtual prop to a target action effect, wherein generating the target action effect on the target includes making a second adjustment on the attribute value of the target related to fighting, the second adjustment being different from the first adjustment;
  determining a target virtual object in the virtual scene in response to detecting the selection operation on the target skill; and
  triggering the target virtual prop to perform an attack that generates the target action effect on the target virtual object in response to the target virtual object being in an action region of the target virtual prop.

15. The non-transitory computer-readable storage medium according to claim 14, wherein the determining a target virtual object in a virtual scene comprises:
  determining a second virtual object as the target virtual object in response to detecting a selection operation on the second virtual object in the virtual scene in a target time period; or
  determining a second virtual object that the target virtual prop previously acted on before the selection operation on the target skill as the target virtual object in response to detecting no selection operation on any second virtual object in the virtual scene in a target time period.

16. The non-transitory computer-readable storage medium according to claim 15, wherein the determining a target virtual object in the virtual scene comprises, in response to detecting no selection operation on any second virtual object in the virtual scene in a target time period:
  obtaining an action moment at which the target virtual prop previously acted on before the selection operation of the target skill; and
  determining a second virtual object that the target virtual prop previously acted on as the target virtual object in response to a duration between the action moment and a current moment being less than a target effective duration.

17. The non-transitory computer-readable storage medium according to claim 14, wherein the method further comprises:
  retrieving a target configuration file corresponding to the first virtual object;
  determining, based on configuration information in the target configuration file, a triggering mechanism corresponding to the target skill;
  triggering the target virtual prop to perform the attack in the automatic attack mode when the triggering mechanism corresponding to the target skill is automatic triggering; and
  triggering the target virtual prop to perform the attack in response to detecting a triggering operation on the target virtual prop when the triggering mechanism corresponding to the target skill is manual triggering.

18. The non-transitory computer-readable storage medium according to claim 17, wherein the target configuration file stores a target effective duration, the target effective duration indicating the triggering mechanism corresponding to the target skill.

19. The non-transitory computer-readable storage medium according to claim 18, wherein the determining, based on configuration information in the target configuration file, a triggering mechanism corresponding to the target skill comprises:
  obtaining the target effective duration from the target configuration file; and
  determining, when the target effective duration is greater than 0, the triggering mechanism corresponding to the target skill as automatic triggering; otherwise, determining the triggering mechanism corresponding to the target skill as manual triggering.

20. The non-transitory computer-readable storage medium according to claim 14, wherein the triggering, in response to the target virtual object being in an action region of the target virtual prop, the target virtual prop to perform the attack comprises:
  obtaining an action moment at which the target virtual prop previously acted and an action duration of the target virtual prop in response to the target virtual object being in the action region of the target virtual prop; and
  stopping a previous action process of the target virtual prop, and triggering the target virtual prop to perform the attack in an automatic attack mode in response to a duration between a current moment and the action moment being less than the action duration.

* * * * *